United States Patent
Ramakrishna

(10) Patent No.: US 9,960,946 B2
(45) Date of Patent: May 1, 2018

(54) METHODS AND APPARATUS FOR LOW POWER OPERATION UTILIZING MULTIPLE ADCS WITH DIFFERENT PRECISIONS

(71) Applicant: Samsung Electronics Co., Ltd., Suwon-si, Gyeonggi-do (KR)

(72) Inventor: Sudhir Ramakrishna, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 352 days.

(21) Appl. No.: 14/622,449

(22) Filed: Feb. 13, 2015

(65) Prior Publication Data

US 2016/0028578 A1    Jan. 28, 2016

Related U.S. Application Data

(60) Provisional application No. 62/029,205, filed on Jul. 25, 2014.

(51) Int. Cl.
*H04L 27/26* (2006.01)
*H04L 25/00* (2006.01)
(Continued)

(52) U.S. Cl.
CPC ........ *H04L 27/2695* (2013.01); *H04L 1/0005* (2013.01); *H04L 25/00* (2013.01); *H04L 25/0292* (2013.01); *H04L 27/2691* (2013.01)

(58) Field of Classification Search
None
See application file for complete search history.

(56) References Cited

U.S. PATENT DOCUMENTS 6,504,863 B1   1/2003  Hellmark
7,656,970 B1 *  2/2010  Sankabathula ....... H04L 43/024
                                                     375/316
(Continued)

FOREIGN PATENT DOCUMENTS

GB        2440988 A     2/2008
KR     20080038509 A    5/2008
(Continued)

OTHER PUBLICATIONS

International Search Report dated Nov. 4, 2015 in connection with International Application PCT/KR2015/007757; 3 pages.

(Continued)

*Primary Examiner* — Ayaz Sheikh
*Assistant Examiner* — Sori Aga

(57) ABSTRACT

An electronic device includes processing circuitry configured to detect a presence of a packet transmission via a channel, establish communication parameters and operational settings of an analog-to-digital conversion (ADC) operation using a training field (TF) of the packet if the packet comprises the TF, and utilize a channel estimation (CE) portion of the packet to perform channel estimation of the channel. The processing circuitry is also configured to utilize the channel estimates to compensate for distortions introduced by the channel with respect to portions of the packet subsequent to the CE portion, obtain a modulation order and coding scheme used for the data portion of the packet, select an analog-to-digital converter (ADC) to be used for a recovery of the data portion of the packet, and recover the information in the data portion of the packet using ADC output samples corresponding to the data portion of the packet.

16 Claims, 8 Drawing Sheets

(51) Int. Cl.
*H04L 25/02* (2006.01)
*H04L 1/00* (2006.01)

(56) References Cited

U.S. PATENT DOCUMENTS

| | | |
|---|---|---|
| 8,335,484 B1 | 12/2012 | Arad et al. |
| 8,849,226 B2 | 9/2014 | Bruchner |
| 2006/0215590 A1 | 9/2006 | Sharma et al. |
| 2007/0066259 A1 | 3/2007 | Ryan et al. |
| 2007/0232344 A1* | 10/2007 | Aoki .................. H04B 7/0874 |
| | | 455/522 |
| 2008/0253470 A1 | 10/2008 | Lee et al. |
| 2010/0128817 A1 | 5/2010 | Philips et al. |
| 2012/0076229 A1 | 3/2012 | Brobston et al. |
| 2013/0016619 A1 | 1/2013 | Rahman et al. |
| 2013/0083875 A1* | 4/2013 | Godbole ........... H04W 52/0245 |
| | | 375/345 |
| 2014/0185515 A1 | 7/2014 | Hong et al. |

FOREIGN PATENT DOCUMENTS

| KR | 20120030592 A | 3/2012 |
|---|---|---|
| WO | WO 01/18970 A1 | 3/2001 |

OTHER PUBLICATIONS

Written Opinion dated Nov. 4, 2015 in connection with International Application PCT/KR2015/007757; 4 pages.
Extended European Search Report dated Dec. 7, 2015 in connection with European Application 15178307.3; 8 pages.

* cited by examiner

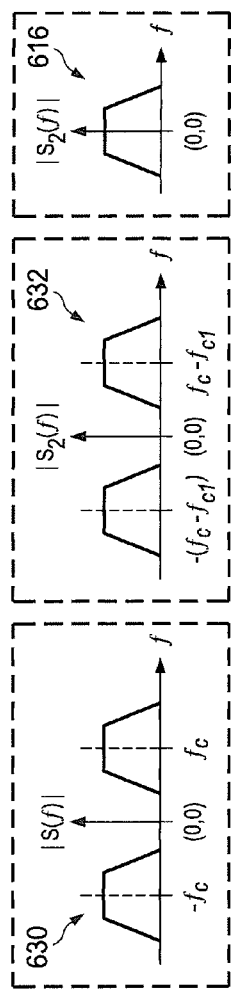
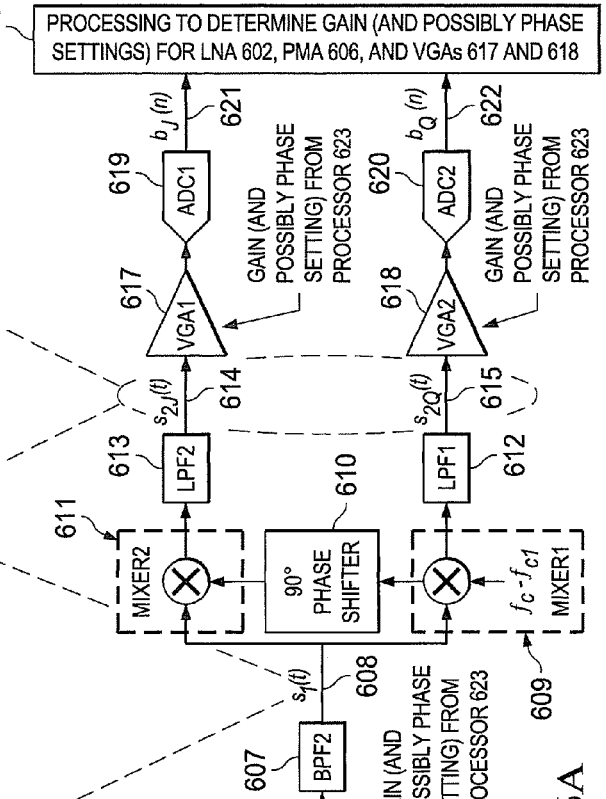
FIG. 6B   FIG. 6C   FIG. 6D
FIG. 6A

US 9,960,946 B2

METHODS AND APPARATUS FOR LOW POWER OPERATION UTILIZING MULTIPLE ADCS WITH DIFFERENT PRECISIONS

CROSS-REFERENCE TO RELATED APPLICATION(S) AND CLAIM OF PRIORITY

The present application claims priority to U.S. Provisional Patent Application Ser. No. 62/029,205, filed Jul. 25, 2014, entitled "METHODS AND APPARATUS FOR LOW POWER OPERATION UTILIZING MULTIPLE ADCs WITH DIFFERENT PRECISIONS". The content of the above-identified patent document is incorporated herein by reference.

TECHNICAL FIELD

The present application relates generally to data packet transmission and, more specifically, to obtaining a highest level of reception for receiving data from a data packet transmission.

BACKGROUND

In a wireless communication network, information is transmitted by a transmitting entity and received by the receiving entity over a wireless channel consisting of several signal propagation paths. Such a channel could include a line-of-sight component, where the transmitter and receiver are physically visible to each other, or could be entirely non-line-of-sight, in which case the signal propagates to the receiver only via reflection and scattering with respect to the various obstructions in the propagation paths. Recovery of the transmitted information at the receiver includes the usage of the analog-to-digital conversion (ADC) operation. This application discloses methods to reduce the power consumption due to the ADC operation.

SUMMARY

In a first embodiment, an electronic device is provided. The electronic device also includes processing circuitry configured to detect a presence of a packet transmission via a channel. The processing circuitry is also configured to establish communication parameters and operational settings of an analog-to-digital conversion (ADC) operation using a training field (TF) of the packet. The processing circuitry is further configured to utilize a channel estimation (CE) portion of the packet to perform channel estimation of the channel. The processing circuitry is also configured to utilize the channel estimates to compensate for distortions introduced by the channel with respect to portions of the packet subsequent to the CE portion. The processing circuitry is further configured to obtain a modulation order and coding scheme used for the data portion of the packet. The processing circuitry is configured to select an analog-to-digital converter (ADC) to be used for a recovery of the data portion of the packet. ADC precision is selected based on the information of the data portion of the packet including the modulation order. The processing circuitry is further configured to recover the information in the data portion of the packet using ADC output samples corresponding to the data portion of the packet.

In a second embodiment, a method is provided. The method includes detecting a presence of a packet transmission via a channel. The method also includes establishing communication parameters and operational settings of an analog-to-digital conversion (ADC) operation using a training field (TF) of the packet. The method further includes utilizing a channel estimation (CE) portion of the packet to perform channel estimation of the channel. The method includes utilize the channel estimates to compensate for distortions introduced by the channel with respect to portions of the packet subsequent to the CE portion. The method also includes obtaining a modulation order and coding scheme used for the data portion of the packet. The method further includes selecting an analog-to-digital converter (ADC) to be used for a recovery of the data portion of the packet. ADC precision is selected based on the information of the data portion of the packet including the modulation order. The method includes recovering the information in the data portion of the packet using ADC output samples corresponding to the data portion of the packet.

In a third embodiment, an electronic device is provided. The electronic device also includes processing circuitry configured to detect a presence of a packet transmission via a channel. The processing circuitry is also configured to determine whether the packet comprises a training field (TF). The processing circuitry is further configured to utilize a channel estimation (CE) portion of the packet to perform channel estimation and obtain precision information adequate for a modulation order of a data portion of the packet using channel estimation.

Other technical features may be readily apparent to one skilled in the art from the following figures, descriptions, and claims. Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6A illustrates example architecture for a "front-end" portion corresponding to a particular antenna of a receiver with respect to the AGC loop functionality according to this disclosure;

FIGS. 6B, 6C, and 6D illustrate example signals at different positions within a receiver according to this disclosure;

DETAILED DESCRIPTION

FIGS. 1 through 10, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated into the present disclosure as if fully set forth herein: Tony J. Rouphael, "Wireless 101: Automatic Gain Control", EE Times, June 2014 (REF 1); John G. Proakis, "Digital Communications", 4th Edition (REF 2); IEEE 802.11ad standard spec., Part 11: Wireless LAN medium access control (MAC) and physical layer (PHY) Specifications, Amendment 3: Enhancements for very high throughput in the 60 GHz Band (REF 3); and IEEE 802.11n-2009 standard spec., Part 11: Wireless LAN Medium Access Control (MAC) and Physical Layer (PHY) Specifications Amendment 5: Enhancements for Higher Throughput (REF 4); "Pipelined ADC Design and Enhancement Techniques," I. Ahmed, 2010, ISBN 978-90-481-8651-8 (REF 5).

Figure 1:
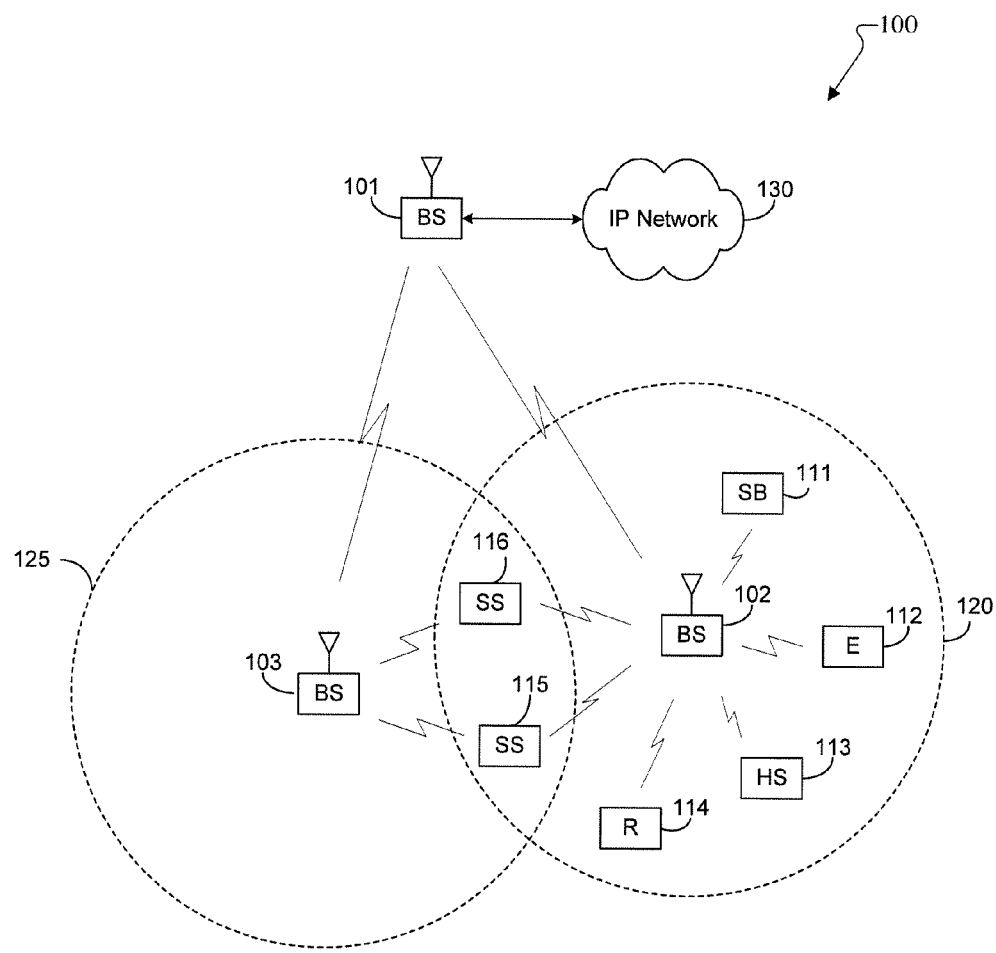
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 may communicate with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," "STA (station)," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, Wi-Fi, WiGiG or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, an apparatus and method are provided herein to reduce the power consumption of an electronic device due to the ADC operation while maintaining system performance of the electronic device. One or more of eNBs 101-103 are configured to support processes to reduce the power consumption of an electronic device due to the ADC operation while maintaining system performance of the electronic device.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
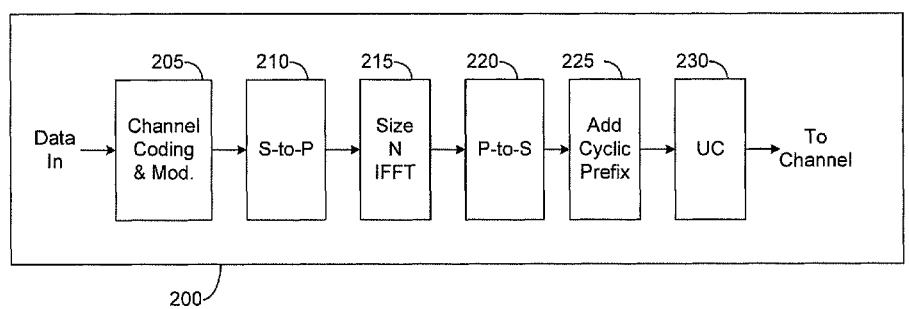
FIGS. 2A and 2B illustrate example wireless transmit and receive paths according to this disclosure.
Figure 2B:
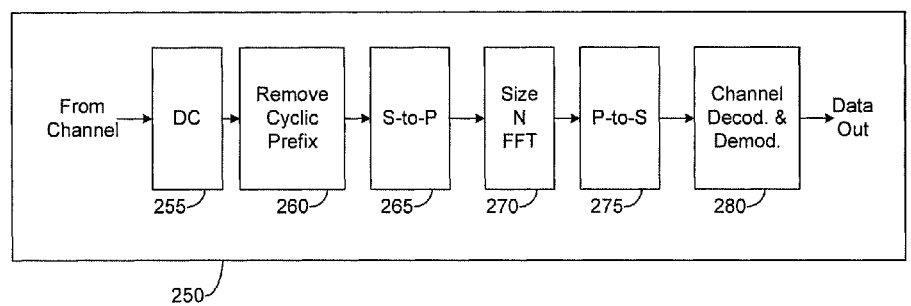

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to transmit data packets designed to minimize the power consumption of a UE due to ADC operations while maintaining system performance of a UE.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix (CP) block 225, and an up-converter (UC) 230. The receive path 250 includes a down-converter (DC) 255, a remove CP block 260, a serial-to-parallel (S-to-P) block 265, a size N Fast Fourier Transform (FFT) block 270, a parallel-to-serial (P-to-S) block 275, and a channel decoding and demodulation block 280. It should be noted that in some implementations, in the transmit path 200, the "S-to-P" 210, the "IFFT" 215, the "P-to-S" 220, and the "add CP" 225 blocks can be replaced by a pulse shaping filter block. Similarly, in the receive path 250, the "remove CP" 260, "S-to-P" 265, "FFT" 270, and "P-to-S" 275 blocks can be replaced by a channel equalizer block.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add CP block 225 inserts a cyclic prefix to the time-domain signal. The up-converter 230 converts the digital signal output from the P-to-S block 220 to analog form via a digital-to-analog (DAC) operation, and then modulates (such as up-converts) the output of the DAC operation to an RF (radio frequency) signal for transmission via a wireless channel. The digital signal output from the add CP block 225 can also be filtered (such as by using a so-called pulse shaping filter) before being inputted to the DAC operation in the UC block 230. As described herein, the output of the channel coding and modulation block 205 can go directly to a pulse shaping filter block.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, followed by an analog-to-digital (ADC) operation to convert the continuous time analog signal to discrete time samples. Subsequently, the remove CP block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream. As described herein, the channel decoding and demodulation block 280 can be preceded by a channel equalizer block, which attempts to minimize the inter-sample interference among the receive samples.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
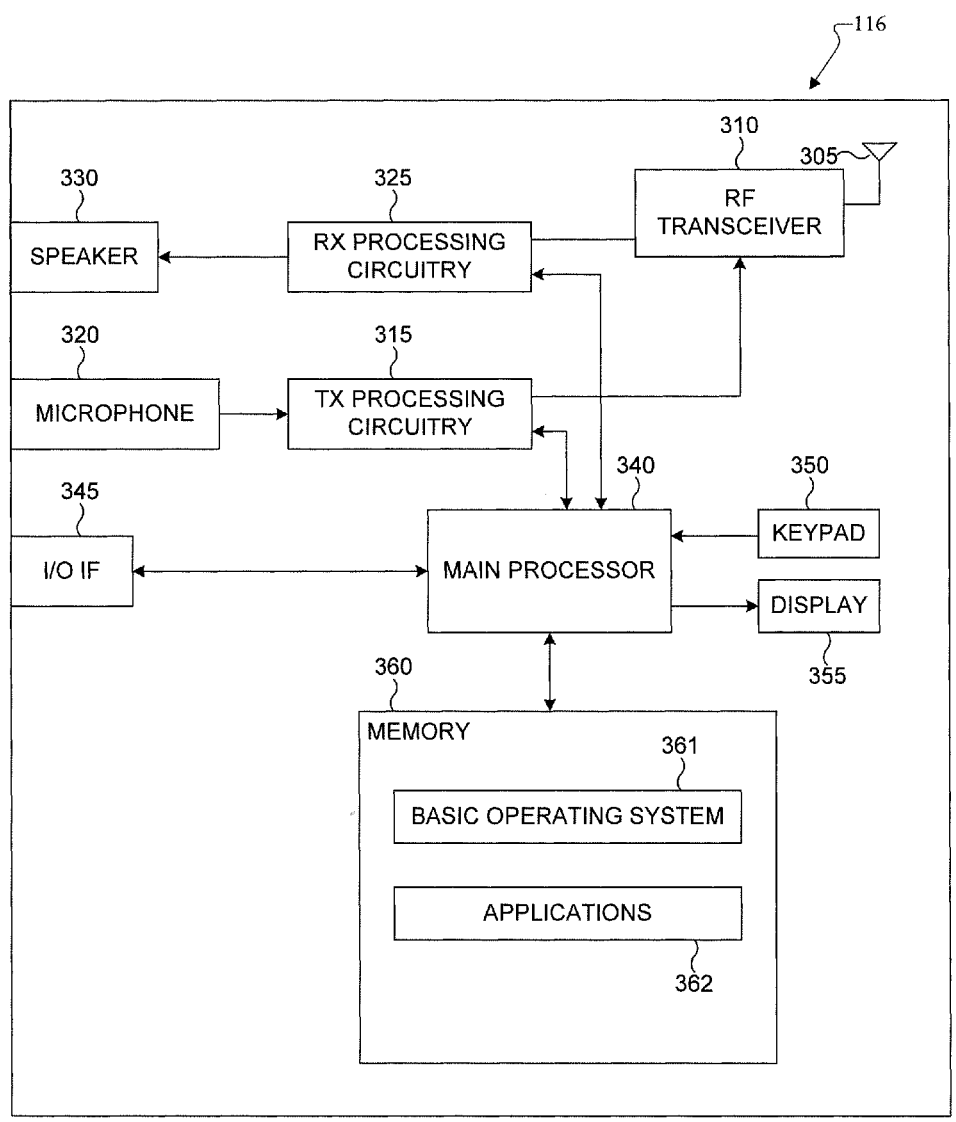
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE. In certain embodiments, the UE 116 shown in FIG. 3 is configured as a STA and capable of communicating according to one or more IEEE 802.11a/b/g/n/ac/ad specifications.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for reducing the power consumption due to the ADC operation while maintaining system performance. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Wireless communication systems use information that is transmitted by a transmitting entity and received by a receiving entity over a wireless channel consisting of several signal propagation paths. A wireless channel can include a line-of-sight component, where the transmitter and receiver can see each other. A wireless channel can also include a non-line-of-sight component, in which case the signal propagates to the receiver via reflection, scattering, and diffraction with respect to the various obstructions in the propagation paths.

In the context of systems based on the IEEE 802.11a/b/g/n/ac/ad specifications, popularly known as "Wireless Fidelity" ("WiFi") or "Wireless Gigabit" ("WiGig"), the entities are referred to as the access point (AP), which is the entity that is connected to the internet, and the station (STA). As a common home environment example, the AP can include a WiFi router connected to the Internet. The AP can also include a laptop containing a WiFi chip or WiFi chipset. With such systems, several situations are possible. For example, an AP can be a transmitter and an STA can be a receiver. In another example, an STA can be a transmitter and an AP can be a receiver. In yet another example, an STA can be a transmitter and another STA can be a receiver. In yet another example, an AP can be a transmitter and another AP can be a receiver, as also discussed in REF 3 and REF 4.

Figure 4:
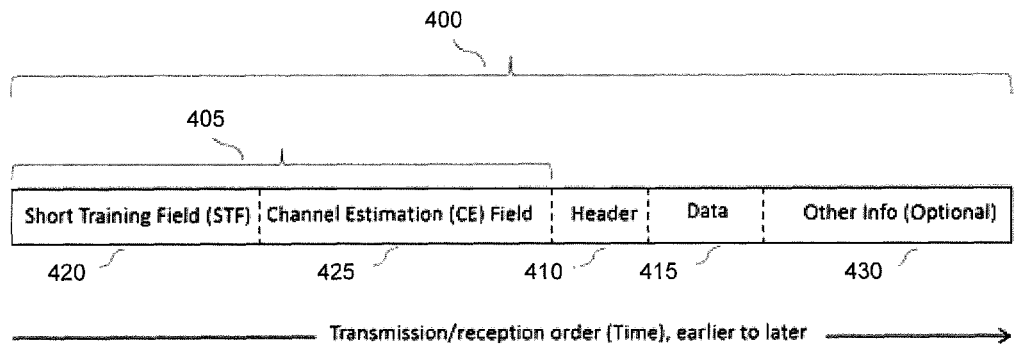
FIG. 4 illustrates an example of a packet according to this disclosure.

Systems based on the IEEE 802.11a/b/g/n/ac/ad specifications are referred to as packet-based systems. This is because there is no a-priori synchronization between the transmitter and receiver. Referring specifically to IEEE 802.11d specifications, which are broadly similar to the IEEE 802.11a/b/g/n/ac specifications, each transmitted packet includes two major portions, in time order: a preamble and the actual data or information portion. FIG. 4 illustrates an example of a packet 400 according to this disclosure. The embodiment of the packet 400 shown in FIG. 4 is for illustration only. Other embodiments of the packet 400 could be used without departing from the scope of this disclosure. In an embodiment, the packet 400 illustrated in FIG. 4 can be an example packet in the IEEE 802.11ad specifications.

In the example shown in FIG. 4, the overall packet 400 includes of the preamble 405, a data header 410, and data portion 415. The preamble 405 includes a short training field (STF) 420 and a channel estimation (CE) portion 425. The data header 410 includes indications about the data to follow. For example, the data header 410 includes the modulation and coding scheme used by the transmitter to represent the data. In another example, the data header 410 includes the size of the data portion. The data portion 415 includes the data itself and follows the data header 410. The preamble 405 is transmitted first. Specifically, the STF 420 of the preamble 405 is transmitted first followed by the CE portion 425 of the preamble 405. The data header 410 is transmitted after the preamble 405. The data portion 415 is transmitted after the data header 410. Hence, the receiver receives the STF 420 first, followed by the CE portion 425, followed by the data header 410, and followed finally by the data portion 415. In certain embodiments, another optional information portion 430 can be transmitted after the data portion 415.

Figure 5:
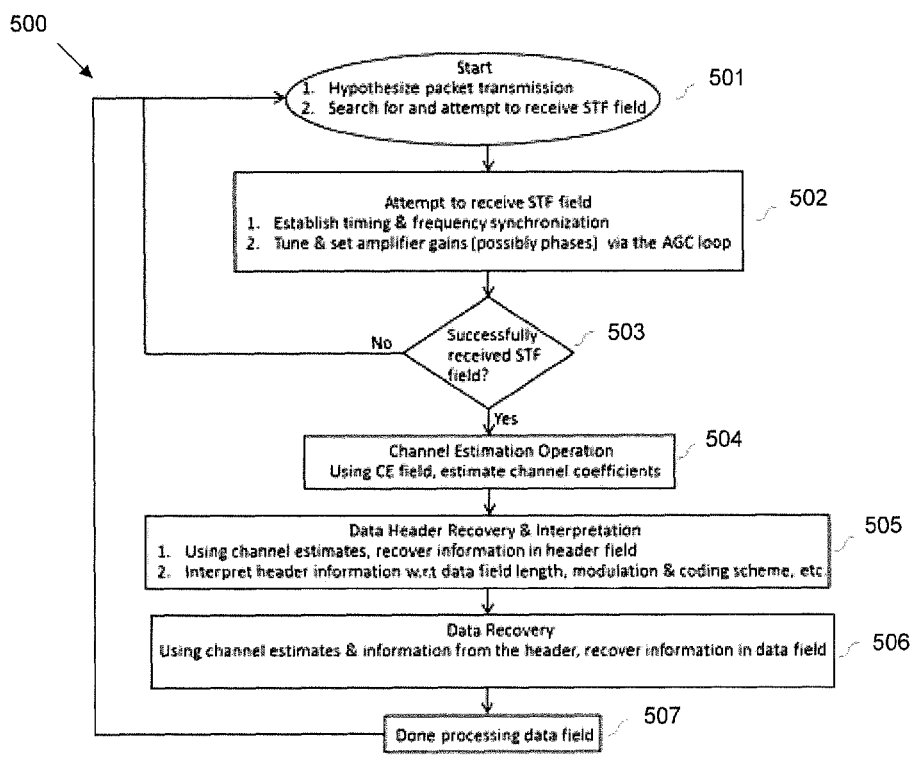
FIG. 5 illustrates an example procedure of packet detection and reception in a packet-transmission-based system according to this disclosure.

FIG. 5 illustrates an example procedure 500 of packet detection and reception in a packet-transmission-based system according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, an AP or a STA. In an embodiment, packet-transmission-based system is an IEEE 802.11ad based system. The structure of the data packet 400 illustrated in FIG. 4 enables a receiver to recover the data in the packet by performing the procedure 500 illustrated in FIG. 5.

At step 501, the process of reception of at least one packet 400 is initiated. A receiver hypothesizes a packet transmission intended for the receiver and attempts to receive the packet 400. At step 502, the receiver attempts to receive the STF portion of the hypothesized packet by trying out various values of the basic communication parameters to use for the reception, as described herein. Basic communication patterns include timing and frequency synchronization and a determination of gains and phases to be applied with respect to the received signal for high-reliability reception. A possible technique to determine the presence of the STF as well as the basic communication parameters is as follows. This technique relies on a possible structure of the STF, where the STF includes certain time-domain pseudo-noise (PN) waveforms or sequences known to the receiver. The receiver can perform a correlation operation on the received signal with copies of such waveforms or sequences. The receiver can hypothesize and attempt different timing and frequency offsets to its copy of the waveform or sequence while also applying various gain and phase values to the received signal. A value of the correlation above a certain predetermined threshold can indicate both the presence of the STF as well as yield values of the basic communication parameters to use for the reception of the rest of the packet. A determination of the gains and phases to be applied to the received signal, for example via an automatic gain control (AGC) loop, is further discussed herein.

At step 503, the receiver performs a check to verify if the STF 420 has been acquired. One possible technique for this verification, as discussed earlier, is for the receiver to perform a correlation operation w.r.t the STF portion of the received signal, and determine the presence or absence of the STF based on whether or not this correlation is above a pre-determined threshold. Another possible technique is for the receiver to verify if the STF 420 has been acquired by checking if the received energy level is above a threshold. If the STF 420 has not been acquired, the receiver goes back to step 501 to continue searching for the STF 420. At step 504, after the receiver determines that the STF 420 has been acquired, the receiver utilizes the CE portion 425 of the packet 400 to perform channel estimation. Utilizing the CE portion 425 to perform channel estimation enables the receiver to estimate and compensate for the amplitude and phase distortions introduced by the transmission channel into the transmitted information. The receiver can subsequently correct the amplitude and phase distortions in subsequent portions of the packet such as the data header 410 and data 415.

At step 505, using the channel estimates, the receiver recovers the information in the data header 410 in order to recover the information in the data portion 415. At step 506, the receiver uses the information of the data header 410 to recover the information in the data portion 415. Once the recovery of the data of the data portion 415 is complete, at step 507, the receiver again begins searching for STF fields 420 of the next hypothesized packet in step 501.

The structure the packet 400 ensures that each packet 400 is self-contained such that the receiver can first synchronize itself with respect to the data in the packet, and subsequently proceed to recover the data in the packet. It should be noted that while the structure of the packet has been described with respect to the IEEE 802.11ad specifications, the packet structure of other packet-based systems, such as packet-based systems that are broadly similar, can also be used. Furthermore, additional fields, such as an optional information portion 406 can follow the data portion 415.

The contents of the packet 400 also include modulated symbols. Modulated symbols are derived at a transmitter from the input bits to be transmitted. The process of modulation includes collecting groups of input bits and mapping the groups of input bits to a so-called symbol constellation point. For example, in quadrature phase shift keying (QPSK) modulation, the symbol constellation includes four points as follows:

$$s_1 = \frac{1}{\sqrt{2}}(1+j), \quad (1)$$

$$s_2 = \frac{1}{\sqrt{2}}(1-j),$$

$$s_3 = \frac{1}{\sqrt{2}}(-1+j) \text{ \& } s_4 = \frac{1}{\sqrt{2}}(-1-j),$$

where $$j = \sqrt{-1}.$$

These four points represent four points in two-dimensional space. To perform QPSK modulation, the bit stream to be transmitted is grouped into sets of two bits. Subsequently, a particular set of two bits is mapped to one of the constellation points based on the value represented by those two bits. For example, a mapping could be: $00 \rightarrow s_1$, $01 \rightarrow s_2$, $10 \rightarrow s_3$ & $11 \rightarrow s_4$. When each constellation form is written in the form $ae^{j\theta}$, with "a" recognized as the amplitude and θ as the phase of the complex number in which j is an imaginary number, then each constellation point represents the imposition of a certain amplitude and phase on the radio frequency carrier waveform on which it is imposed by the transmitter. Additional details of the modulation process may be found in Chapter 4 of REF 2.

In addition, a channel encoder at the transmitter processes the bits before the modulation process. The channel encoder adds redundancy into the bit stream in order to increase the reliability with which the bits are recovered in the presences of channel impairments. As an example, a particular channel encoder operates on blocks of inputs bits of a certain size, for example N bits, and appends N additional bits to form the encoded block of 2N bits. In this case, the appended bits are referred to as parity bits. Each parity bit is calculated as a certain linear combination of the N information bits. This encoder is referred to as a "rate ½" encoder, since two bits are output per input bit. Additional details of channel encoding may be found in Chapter 8 of REF 2.

The different portions of the packet 400 (such as the STF 420, CE field 425, data header 410, and data portion 415) contain modulation symbols. Each portion may use a different coding or modulation scheme. After compensating for the amplitude and phase distortions introduced by the channel via the channel estimates, the receiver applies the reverse processing to yield the original bits that were transmitted.

In wireless communication systems, the continuous time analog signal as received by the receive antenna is processed to convert the continuous time analog signal into a sequence of samples corresponding to distinct and discrete time instances. Further processing is subsequently performed on these discrete or "digital" samples. This process is referred to as analog-to-digital conversion, and it is performed by an entity referred to as the analog-to-digital converter (ADC). In the ADC operation, the expected range of signal amplitude variations are partitioned into a set of sub-ranges or bins. The ADC typically represents all input analog signal values lying within a certain sub-range or bin by a certain fixed and discrete output value represented by a certain number of bits. All values beyond the highest and lowest values are represented by a fixed highest and lowest output value, respectively. These highest and lowest values represent the dynamic range of the ADC, whereas the number of sub-ranges or bins is a measure of its accuracy. For example, the number of sub-ranges or bins is a measure of the ability of the ADC to maintain an accurate representation of the spectral content of the signal. The number of bins can be referred to as the resolution of the ADC. In order to minimize the distortion to the input signal characteristics (such as shape, gain, and phase), it is advantageous to magnify or compress the gain of the input signal so that the signal variations match the dynamic range of the ADC. This functionality is implemented via the automatic gain control (AGC) loop, which is described herein. Additional details of ADC behavior may be found in Chapter 3 of REF 2.

FIG. 6A illustrates example architecture for a "front-end" portion corresponding to a particular antenna of a receiver 600 with respect to the AGC loop functionality according to this disclosure. The embodiment of the receiver 600 shown in FIG. 6A is for illustration only. Other embodiments of the receiver 600 could be used without departing from the scope of this disclosure.

The receiver 600 includes several receive antennas 601. The architecture and functionality for each antenna can be the same as for the receive antenna 601 shown in FIG. 6A. The receive antenna 601 includes the element in the receiver 600 that receives radio frequency (RF) signals that arrive via the propagation channel from the transmitting antenna (or multiple antennae) of a transmitting entity. The received signal is then processed by the low-noise amplifier (LNA) 602. The LNA 602 processes the received signal by modifying the amplitude (and in at least some cases the phase) of the signal so as to meet some performance criteria, for example, to maintain the dynamic range of the signal within pre-set limits. The gain (and in at least some cases the phase) of the received signal are modified by the LNA 602 according to inputs from the processor 623 which is discussed herein. The output from the LNA 602 is processed by the band-pass filter (BPF1) 603 and results in the signal 604 denoted as s(t), where t denotes time.

FIGS. 6B, 6C, and 6D illustrate example signals 630, 632, and 616 at different positions within a receiver 600 according to this disclosure. The embodiments of the signals 630, 632, and 616 shown in FIGS. 6B, 6C, and 6D are for illustration only. Other embodiments of the signals 630, 632, and 616 could be used without departing from the scope of this disclosure.

As illustrated in FIG. 6B, the effect of BPF1 603 is to restrict the magnitude of the signal s(t) to a certain bandwidth about a carrier frequency denoted as $f_c$. This bandwidth typically contains the useful information associated with the signal. The carrier frequency and the bandwidth are typically known to the receiver 600. The signal s(t) is then processed by the mixer 605, which consists of multiplying the signal s(t) with a sinusoid at a frequency $f_{c1}$ which is different from the carrier frequency $f_c$. A sinusoid can be a signal in the following form:

$$a\cos(2\pi f_{c1}t+\theta)+b\sin(2\pi f_{c1}t+\varphi), \qquad (2)$$

with the amplitudes a,b and phases $\theta,\varphi$ being tunable parameters, and t denoting time. An example mixer implementation can have a=0 or b=0, and a mechanism to ensure that the phase ($\theta$ or $\varphi$) is as small as possible.

The output from the mixer 605 is fed to the post-mixer amplifier (PMA) 606, which modifies its gain (and in at least some cases its phase) according to inputs from the processor 623. The signal output from the PMA 606 is fed to the band pass filter (BPF2) 607, which restricts the signal magnitude to a certain set of frequencies centered around the intermediate carrier frequency $f_c-f_{c1}$. The combination of the mixer 605, the PMA 606 and the BPF 607 can be referred to as the intermediate-frequency or IF stage, because the frequency contents of the signal are shifted to the carrier frequency $f_c-f_{c1}$, which is lower than the original carrier frequency fc, while maintaining the overall "frequency response" of the signal. A comparison of signal 630 of FIG. 6B and signal 632 of FIG. 6C shows the amplitude response of the RF and IF signals s(t) and $s_1$(t), respectively.

The output signal $s_1$(t) 608 from the BPF 607 is fed to the block consisting of the mixers 609 and 611 as well as the low pass filters (LPFs) 612 and 613, resulting in the output signal $s_2$(t) with in-phase and quadrature components $s_{2I}$(t) 614 and $s_{2Q}$(t) 615. The in-phase and quadrature components can be referred to as the "real" and "imaginary" components of the signal, with the signal represented as $s_2(t)=s_{2I}(t)+js_{2Q}(t)$, $j=\sqrt{-1}$ being the imaginary unit. Additional details of signal representations may be found in Chapter 4 of REF 2.

The mixers 609 and 611 operate at the same frequency $f_c-f_{c1}$, but with a relative phase offset of 90°, as shown by the phase shifter 610. As discussed herein below, the mixer operation consists of multiplying the input signal by a sinusoid, in this case a sinusoid at the frequency $f_c-f_{c1}$. In a typical implementation, mixer 609 and mixer 611 multiply the input signal $s_1$(t) by the sinusoids $\sin(2\pi(f_c-f_{c1})t)$ and $\cos(2\pi(f_c-f_{c1})t)$, respectively. The combination of the mixer 609 and mixer 611 as well as LPF 612 and LPF 613 leads to the "baseband" signal $s_2$(t). Signal $s_2$(t) is called the "baseband" signal because its frequency content is centered around zero frequency as illustrated in FIG. 6D. The implementation of mixer 609 and mixer 611 as well as LPF 612 and LPF 613 shifts the frequency contents of the signal $s_2$(t), from the center frequency, $f_c-f_{c1}$, to zero center frequency while maintaining the overall "frequency response" of the signal.

Subsequently, the gain (and in at least some cases the phase) of the quadrature signals $s_{2I}$(t) 614 and $s_{2Q}$(t) 615 are modified by the variable-gain amplifiers (VGAs) 617 and 618, respectively, according to inputs from the processor 623. The outputs from VGA 617 and VGA 618, which are continuous time analog signals, are then sampled and converted into a digital form by the ADC 619 and the ADC 620, respectively. This generates a discrete time digital sequences $b_I$(n) 621 and $b_Q$(n) 622, respectively. With $b_I$(n) 621 and $b_Q$(n) 622, the "n" denotes the discrete time index. Since a specific number of bits are used to represent the discrete time index, the values of $b_I$(n) 621 and $b_Q$(n) 622 are restricted to a discrete set (as opposed to the continuous set of values that the signals s(t), s1(t) or s2(t) could take).

The STF including the first portion of every packet also includes training or pilot signals with known characteristics (such as contents) and transmit power for the purpose of calibration of the AGC loop. Accordingly, the samples $b_I$(n) 621 and $b_Q$(n) 622, respectively, corresponding to these transmissions are input to the processor 623. Using these samples $b_I(n)$ 621 and $b_Q(n)$ 622, the processor 623 determines the gains (and in at least some cases phases) that the LNA 602, the PMA 606 and the VGAs 617 and 618 should apply. As discussed herein, these gains (and in at least some cases phases) are set so that the dynamic range of the in-phase and quadrature continuous-time analog signals $s_{2I}(t)$ 614 and $s_{2Q}(t)$ 615, respectively, match the dynamic range of the ADCs 119 and 120, respectively, ensuring that the samples $\{b_I(n)\}$ and $\{b_Q(n)\}$ accurately represent the spectral content of $s_{2I}(t)$ 614 and $s_{2Q}(t)$ 615. Thus, the spectral content of $s_{2I}(t)$ 614 and $s_{2Q}(t)$ 615 can accurately represent the spectral content of the signal received at the antenna 601. REF 1 contains details of techniques to determine the gains (and in at least some cases phases) from the samples $b_I(n)$ and $b_Q(n)$.

Figure 7:
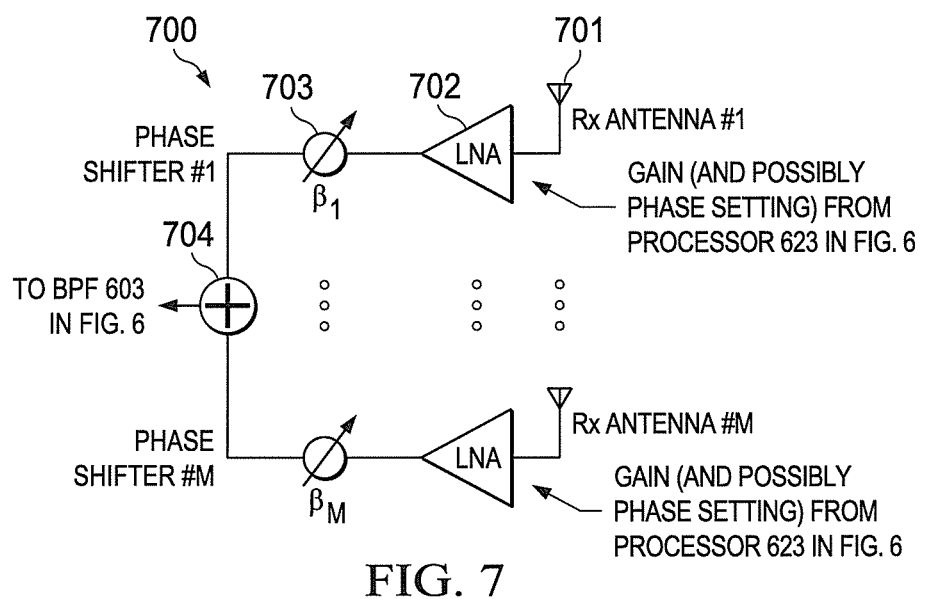
FIG. 7 illustrates an example one-dimensional receive antenna array according to this disclosure.

The receive antenna 601, shown as a single entity in FIG. 6A, can alternatively be replaced by an array of antennas arranged in a one-, two- or three-dimensional pattern. FIG. 7 illustrates an example one-dimensional receive antenna array 700 according to this disclosure. The embodiment of the antenna array 700 shown in FIG. 7 is for illustration only. Other embodiments of the antenna array 700 could be used without departing from the scope of this disclosure.

In the example shown in FIG. 7, the antenna array 700 includes M number of receive antennas 701. The antenna 701 receives the RF signal, which is then processed by the LNA 702. In certain embodiments, the LNA 702 is the LNA 602 illustrated in FIG. 6A. A phase shift is then applied to the signal output from the LNA 702 using the phase shifter 703. The phase shifts corresponding to different receive antennas in the array can be different from each other. The outputs from the phase shifters 703 in each antenna branch are then added by the adder 704. The signal output from the adder is then input into the BPF1 603 illustrated in FIG. 6A. The net effect of such an array of antennas is to enable the ability to amplify the signals arriving from chosen spatial directions. The phased array shown in FIG. 7 can be thought of as logically representing a single antenna in behavior, though it is constructed with several individual antenna elements.

In some systems, a single ADC is used for an all AGC-loop, channel estimation, and data recovery operations. Reducing the power consumed by the ADC is the main objective of this invention. Higher data rates that necessitate higher sampling rates lead to higher power consumptions. If the AGC settings and the channel estimates are known to a high level of accuracy, a lower-resolution ADC to recover the data can be utilized while making use of the AGC settings and high-resolution channel estimates, enabling the reduction of the power consumption due to the ADC operation with minimal performance loss with respect to throughput.

Consider an analog voltage signal input to the ADC, taking on a continuum of values in a certain range [L, U], where L (volts) is the lowest value of the signal, and U (volts) is the largest value. Consider an ADC, referred to as ADC1, that uses N1 bits to represent each discrete output sample. In this case, the outputs of ADC1 can take $2^{N1}$ distinct discrete values. Then, a simple quantization scheme, referred to as uniform quantization, is for the ADC to divide the input analog signal range [L, U] into $2^{N1}$ sub-ranges, indexed from 0 to $2^{N1}-1$. For all input analog signal values in a particular sub-range, the output would be the N1-bit digital representation of the sub-range index. Each sub-range would represent $\delta=(U-L)/2^{N1}$ volts. An example mapping could include mapping all input analog signal values over the [L, L+$\delta$] volt sub-range to the discrete sample represented by index #0 (output would be all N1 bits as 0), all input analog signal values over the [L+$\delta$, L+2$\delta$] volt sub-range to the discrete sample represented by index #1 (output would have the N1-1 most significant bits as 0, and the least significant bit as 1), and so forth, with the last subrange, namely [U-$\delta$, U] volt mapped to the index $2^{N1}-1$, represented by all N1 output bits being set to 1.

Next, consider another ADC, referred to as ADC2, that uses N2 bits per sample, where N2<N1. More specifically, let N2=N1-1, such that ADC2 uses one less bit per sample as compared to ADC1. Clearly, the outputs of ADC2 can take only half the number of distinct discrete values as compared to the outputs of ADC1 ($2^{N2}=2^{N1-1}=\frac{1}{2}*2^{N1}$)/ Consequently, an input signal sub-range in the operation of ADC2 is twice as large as a sub-range in the operation of ADC1, due to which the ability to discriminate between analog inputs is halved as well. For example, with respect to ADC1, consider two analog signal input values, lying in the ranges [L, L+$\delta$] volts and [L+$\delta$, L+2$\delta$] volts, respectively. If ADC1 is used to convert them to discrete samples, they can clearly be distinguished, since they would correspond to the N1-bit indices 0 and 1 respectively. However, if ADC2 is used, they would both correspond to the same N2-bit index 0, such as so they could not be distinguished. The previous description is an example illustrating the fact that when comparing between two ADCs, an ADC which uses a larger number of bits per sample, in general, provides a better resolution with respect to distinguishing between different analog inputs, which implies that the output samples represent a smaller distortion w.r.t the input analog signal.

In general, having as large an ADC resolution or precision (such as a number of bits per sample) as possible is preferred. However, the power consumption of an ADC increases with it precision, such as with the number of bits per sample used by the ADC. The reason for this is that as the ADC precision increases, the number of analog components required to enable the ADC operation increases as well, leading to an overall increase in power consumption. Two examples are provided below, illustrating the increase in ADC power consumption as a function of the precision, with respect to two common ADC architectures. These architectures are illustrated in Chapter 2 of REF 5.

With a first example, flash ADCs are provided. In the flash ADC architecture, $2^N-1$ analog comparators are required to yield N-bit precision. An analog comparator is an analog device, which takes two analog signals as the input, one of them referred to as the signal of interest and the other as the reference, and outputs an analog "high" or "low" depending on whether the signal of interest is higher or lower than the reference. The power consumption of a flash ADC is dominated by the power consumption of the comparators, which as above, increase exponentially in number with respect to precision, leading to an exponential increase in power consumption w.r.t precision. Hence, an N-bit flash ADC consumes approximately twice the power of an N-1 bit flash ADC. In other words, a 1-bit reduction in precision leads to a power saving of 50% with respect to flash ADCs.

With a second example, successive approximation register (SAR) ADCs are provided. In the SAR ADC architecture, the conversion of the input analog signal to discrete samples is performed via an intermediate conversion of an intermediate discrete sample to its analog version via a digital-to-analog conversion (DAC) operation. For N-bit precision, the intermediate DAC uses the usage of $2^N-1$ analog components in the form of analog switches and current (or voltage) sources. As in the flash ADC case, this increase in the number of analog components with precision leads to a corresponding increase in the ADC power consumption with respect to precision.

A single ADC is typically used for all AGC-loop, channel estimation and data recovery operations. Reducing the power consumed by the ADC is a benefit to the concepts discussed herein. Higher data rates, which necessitate higher sampling rates and higher ADC precisions also lead to higher power consumptions. As noted above, the ADC power consumption is strongly related to its precision. Methods and devices discussed here reduce ADC power consumption by allowing lower-precision operations. If the AGC settings and the channel estimates are known to a high level of accuracy, then lower-resolution ADCs can be sufficient to recover the data, given that the AGC settings and channel estimates obtained via the usage of higher-resolution ADCs are available and used. A set of techniques discussed herein can be used to reduce the power consumption due to the ADC operation with minimal performance loss with respect to throughput.

A receiver can include two or more ADCs available to process the received signal per receive antenna. With a phased array of antennas, two ADCs are available per distinct group or set of antenna elements that are operated together. The group of antenna elements is operated such that the received signal from each of antenna elements are processed and added to yield a net received signal representing that arrangement of antenna elements.

In an embodiment, one of the two or more ADCs has a higher resolution than the remaining ADCs. In this case, the resolution can be in terms of the number of bits or the number of bits per sample. The ADCs can have at least two operating modes with respect to ADC operations: an active operating mode and an inactive or idle operating mode. With an active operating mode, the ADC converts the input analog signal to discrete samples. With an inactive operating mode, that ADC is not performing analog-to-digital conversion. The inactive operating mode consumes less power than the operating mode. For a given received analog signal, one of the ADCs is selected to perform the ADC operation such that different portions of the analog signal are converted to samples or digital equivalents at different ADC resolutions.

Figure 8:
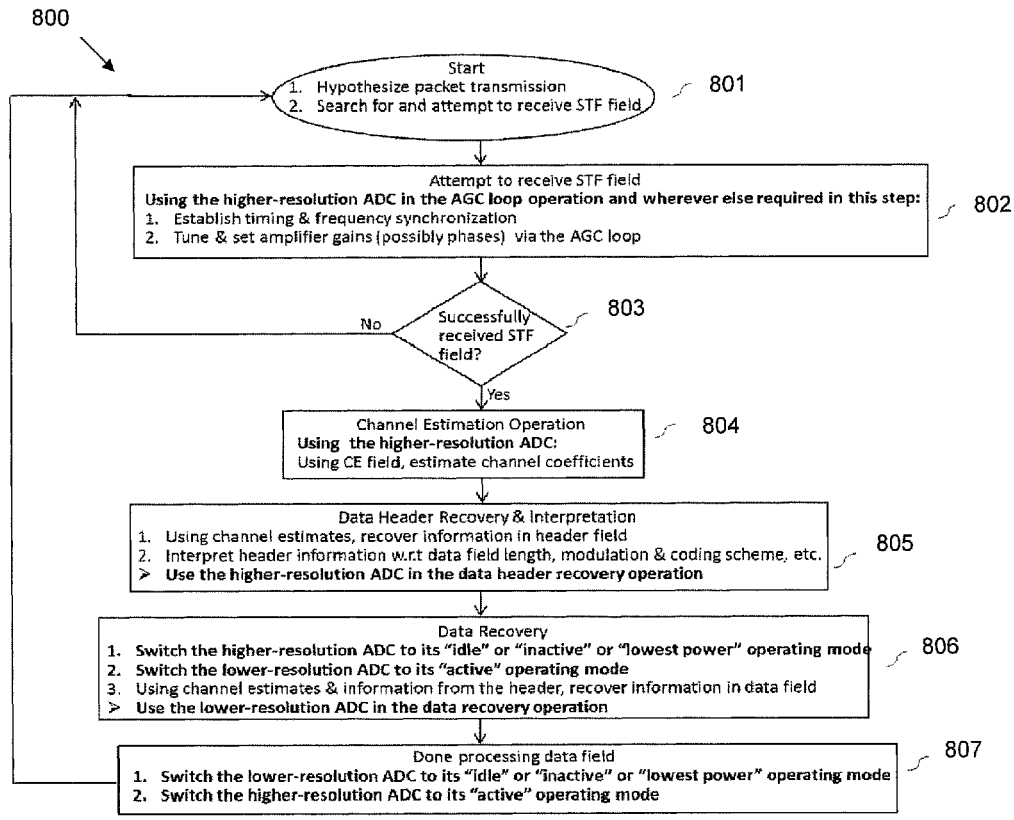
FIG. 8 illustrates an example procedure of packet detection and reception in a packet-transmission-based system according to this disclosure.

FIG. 8 illustrates an example flow diagram 800 of packet detection and reception, including the selection of ADCs of different resolutions so that different portions of the analog signal are converted to samples or digital equivalents at different ADC resolutions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a station.

At step 801, the process of reception of at least one packet 400 is initiated. A receiver hypothesizes a packet transmission intended for the receiver and attempts to receive the packet 400. At step 802, the receiver attempts to receive the STF portion of the hypothesized packet by testing out various values of the basic communication parameters to use for the reception, as described herein. Basic communication patterns include timing and frequency synchronization and a determination of gains and phases to be applied with respect to the received signal for high-reliability reception. A possible technique to determine the presence of the STF as well as the basic communication parameters is as follows. This technique relies on a possible structure of the STF, wherein the STF includes certain time-domain pseudo-noise (PN) waveforms or sequences known to the receiver. The receiver can perform a correlation operation on the received signal with copies of such waveforms or sequences. The received can hypothesize and attempt different timing and frequency offsets to its copy of the waveform or sequence while also applying various gain and phase values to the received signal. A value of the correlation above a certain pre-determined threshold can indicate both the presence of the STF as well as yield values of the basic communication parameters to use for the reception of the rest of the packet. The determination of the gains and phases to be applied to the received signal, for example via the automatic gain control (AGC) loop, is described herein. Since two ADCs are available, the use of the higher resolution ADC is explicitly specified in step 802.

At step 803, a check is carried out to verify if the STF has indeed been acquired. One possible technique for this verification, as discussed herein, is for the receiver to perform a correlation operation with respect to the STF portion of the received signal, and determine the presence or absence of the STF based on whether or not this correlation is above a pre-determined threshold. Another possible technique is for the receiver to verify if the STF 420 has been acquired by checking if the received energy level is above a threshold. If the STF has not been acquired, the receiver goes back to step 801 to continue searching for the STF. Otherwise, the method continues to step 804. At step 804, the receiver utilizes the channel estimation (CE) portion of the packet to perform channel estimation. This utilization enables the receiver to estimate and compensate for the amplitude and phase distortions introduced by the transmission channel into the transmitted information and provide a correction for them. As in block 802, the use of the higher resolution ADC is explicitly specified in step 804.

At step 805, utilizing the channel estimates, the receiver recovers the information in the header sub-portion of the data portion. As in step 802, the use of the higher resolution ADC is explicitly specified in step 805. At step 806, the higher-resolution ADC is switched from its "active" mode to its "idle" mode, while the lower-resolution ADC is switched from its "idle" mode to its "active" mode. Then, using the channel estimates and data header information from steps 804 and 805 respectively, the data is recovered while operating with the lower-resolution ADC. This operation utilizes the low precision ADC for recovery of the data portion of a packet which leads to a reduction in the power consumption for this portion of the packet. While the sizes of the STC, CE, and preamble portions are pre-determined, the size of the data portion is variable. For most packets, the data portion is larger (such that the data portion contains more bits and extends longer with respect to transmission time) than the STC, CE, and preamble portions. Thus, this operation affords power consumption saving with respect to typically the largest portion of the packet.

At step 807, the lower-resolution ADC is switched from its "active" mode to its "idle" mode, while the higher-resolution ADC is switched from its "idle" mode to its "active" mode. Then, the following operation, which is the search for the STF, is performed using the higher-resolution ADC.

In an embodiment, when a single ADC with two selectable resolutions is used instead of two ADCs with different resolutions, all steps with respect to a lower resolution ADC are replaced by steps with respect to the lower resolution mode of the ADC. Furthermore, all steps with respect to a higher resolution ADC are replaced by steps with respect to the higher resolution mode of the ADC. For example, as shown in FIG. 8, at steps 802, 804, and 805, the term "higher resolution ADC" is replaced by "higher resolution of the ADC." At step 806, element 1 is eliminated, element 2 is replaced by "operate the ADC in its lower resolution mode," and "lower resolution ADC" is replaced by "a lower resolution of the ADC." At step 807, elements 1 and 2 are replaced by a single element where the ADC is switched to the higher resolution mode.

Additional ADC switching rules can be implemented taking into account the ADC mode switching time to ensure that the ADCs are in the correct mode when performing the ADC steps. For example, at step 805, the lower precision ADC can be switched from its "idle" to its "active" mode. The analog signal can be input to the lower precision ADC in addition to being input to the higher-precision ADC. Furthermore, the digital samples from the lower-resolution ADC can be discarded so that only those outputted from the higher-resolution ADC are used. At step 806, element 2 can no longer be used. It should be noted that switching the lower precision ADC from its "idle" to its "active" mode, along with the analog signal being fed to the lower precision ADC, can be performed at any point from step 801 to step 805. If the lower precision ADC is switched from its "idle" to its "active" mode before step 806, then the digital samples outputted from the lower precision ADC are discarded.

In another embodiment, assuming the availability of multiple ADCs each with a different precision, a selection of an ADC with a precision sufficient for satisfactory operation with respect to the modulation order of the information in the data field of the packet (which is sought to be recovered) can be made. As disclosed herein, the process of modulation involves (at the transmitter) collecting groups of input bits and mapping the input bits to a so-called symbol constellation point.

Figure 9A:
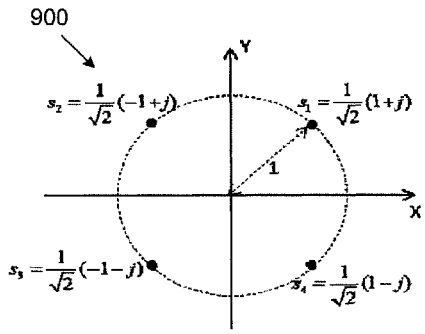
FIGS. 9A and 9B illustrate example signal constellations according to this disclosure.
Figure 9B:
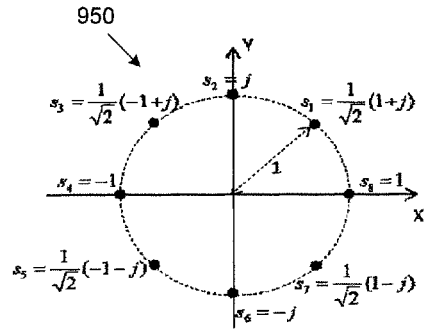

FIGS. 9A and 9B illustrate example signal constellations for QPSK and 8-PSK modulation, consisting of 4 signal points at signal constellation 900 and 8 signal points at signal constellation 950, respectively according to this disclosure. The embodiments of the signal constellations 900 and 950 shown in FIGS. 9A and 9B are for illustration only. Other embodiments of the signal constellations 900 and 950 could be used without departing from the scope of this disclosure.

In QPSK modulation, a particular set of 2 input bits is mapped to a particular one of the 4 constellation points by the transmitter. An example mapping, as explained earlier, could be: 00→s1, 01→s2, 10→s3 & 11→s4. A similar mapping rule would be used for 8-PSK, where particular sets of 3 bits are mapped to particular constellation points. An example mapping could be 000→s1, 001→s2, 010→s8, and so on. Assuming that any one of the signal constellation points is equally likely to be transmitted, the average power of the signal constellation points can be defined as in Equation 3:

$$P_{Average} = \frac{1}{N}\sum_{i=1}^{N}|s_i|^2, \quad (3)$$

where N is the number of signal constellation points (4 and 8 in the case of QPSK and 8-PSK, respectively). It may be noted that the QPSK and 8-PSK constellations in FIGS. 9A and 9B have the same average signal power. Hence, given the usage of a similar transmit power and reception with a certain given propagation loss, a higher precision ADC would be required in the 8-PSK case as compared to the QPSK case. This is a consequence of the fact that for signal constellations with a certain given average power, the constellation with more signal points will necessarily have them "closer" together, such that they will have smaller inter-signal point distances. Hence, in order to tell the signal points apart with the same fidelity, one would need to utilize a larger resolution ADC in the larger constellation case as compared to the smaller constellation case. In practice, the appropriate ADC resolution to use for a given modulation order can be determined via simulations. A modulation order to ADC resolution can be stored as an offline table.

The use of the highest resolution ADC for the data portion recovery can be un-necessarily large for the required performance in the case of a small modulation order and can lead to un-necessarily large amounts of power consumption. Thus, it can be advantageous to adapt the ADC resolution during the recovery of the data portion of the packet based on the modulation order of the data portion of the packet. The modulation order can be determined from the data header portion of the packet.

Figure 10:
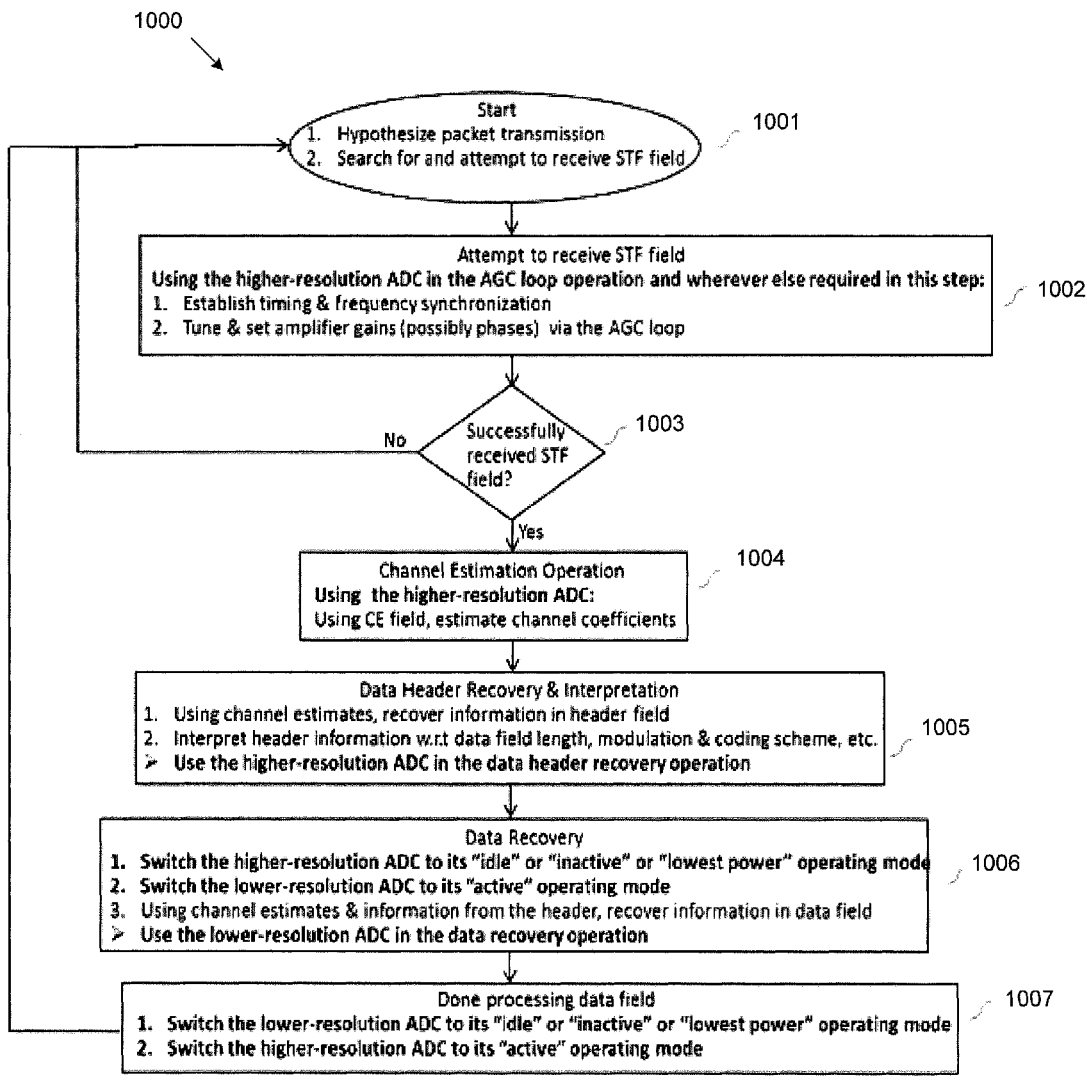
FIG. 10 illustrates an example procedure of packet detection and reception in a packet-transmission-based system according to this disclosure.

FIG. 10 illustrates an example flow diagram 1000 of ADC functionality according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a station.

At step 1001, the process of reception of at least one packet 400 is initiated. A receiver hypothesizes a packet transmission intended for the receiver and attempts to receive the packet 400. At step 1002, the receiver attempts to receive the STF portion of the hypothesized packet by testing out various values of the basic communication parameters to use for the reception, as described herein. Basic communication patterns include timing and frequency synchronization and a determination of gains and phases to be applied with respect to the received signal for high-reliability reception. A possible technique to determine the presence of the STF as well as the basic communication parameters is as follows. This technique relies on a possible structure of the STF, where the STF includes certain time-domain pseudo-noise (PN) waveforms or sequences known to the receiver. The receiver can perform a correlation operation on the received signal with copies of such waveforms or sequences. The receiver can hypothesize and attempt different timing and frequency offsets to its copy of the waveform or sequence while also applying various gain and phase values to the received signal. A value of the correlation above a certain pre-determined threshold could indicate both the presence of the STF as well as yield values of the basic communication parameters to use for the reception of the rest of the packet. The determination of the gains and phases to be applied to the received signal, for example via the automatic gain control (AGC) loop, is described herein. Since two ADCs are available, the use of the highest resolution ADC is explicitly disclosed in step 1002.

At step 1003, a check is carried out to verify if the STF has indeed been acquired. One possible technique for this verification, as described herein, is for the receiver to perform a correlation operation with respect to the STF portion of the received signal, and determine the presence or absence of the STF based on whether or not this correlation is above a pre-determined threshold. Another possible technique is for the receiver to verify if the STF 420 has been acquired by checking if the received energy level is above a threshold. If the STF has not been acquired, the receiver goes back to step 1001 to continue searching for the STF. Otherwise, the method continues to step 1004. At step 1004, the receiver utilizes the channel estimation (CE) portion of the packet to perform channel estimation. This utilization enables the receiver to estimate and compensate for the amplitude and phase distortions introduced by the transmission channel into the transmitted information and provide a correction for them. As in step 1002, the use of the highest resolution ADC is explicitly specified in step 1004.

At step 1005, utilizing the channel estimates, the receiver recovers the information in the header sub-portion of the data portion. As in step 1002, the use of the higher resolution ADC is explicitly specified in step 1005. In Step 1006, which is concerned with the recovery of the data portion of the packet, the ADC to be used for the data recovery is selected to have a precision adequate with respect to the modulation order of the data portion. An "adequate" precision would be a precision larger than or equal to the precision used for a satisfactory recovery of the data. As discussed herein, this can be based on a pre-determined map between the modulation order and ADC precision. This particular ADC is switched to its "active" mode and used in the data recovery operation, while the other ADCs are switched to their "idle" modes. At Step 1007, once the recovery of the data portion of the packet is complete, the highest resolution ADC is turned to its "active" mode, while all other ADCs are switched to their "idle" modes. The advantage of this method is to provide further power consumption savings with respect to legacy methods by adapting the ADC precision to the modulation order of the data portion of the packet.

In an embodiment, rather than multiple ADCs with different precisions, a single ADC with multiple selectable precisions can be used. For example, at steps 1002 to 1005 in FIG. 10, the term "highest resolution ADC" is replaced with "highest resolution of the ADC." Furthermore, step 1006 is replaced with the following steps: 1) based on the modulation order used for the data portion of the packet (determined from the header), determine and switch the ADC to an adequate precision and 2) using channel estimates and information from the header, recover information in data field. Step 1007 is also replaced with the following step: switch the ADC to its "idle" or "inactive" or "lowest power" operating mode.

In an embodiment, after the data recovery steps are complete, in order to enable power savings in the idle mode operation, where the receiver hypothesizes the existence of a packet transmission and searches for the STF field of the packet, the following steps can be performed. In a case with multiple ADCs, the lowest precision ADC is switched to its "active" mode (if not already in that mode), while all other ADCs are switched to their "idle" modes. In a case when an ADC has multiple selectable precisions, the ADC is operated in its lowest precision. At this point, the receiver is in idle mode, hypothesizing and searching for packet transmissions, or more specifically, for the STF field that precedes a packet. In this case, the following steps are performed: First, the receiver attempts to detect the presence of a packet transmission, while using the lowest ADC precision. This can be done, for example, via energy detection, where the receiver attempts to detect changes in received signal energy. Such a change triggers a switch to a higher ADC precision, adequate to recover the STF field and set the AGC control loops as well as recover the timing and synchronization successfully. Some possible techniques for detecting the STF field of the packet have been described herein. The ADC precision required for such a successful operation with respect to the STF field can be determined offline, with knowledge of the structure (coding and modulation) of the STF field. On the other hand, the receiver stays in the "search" mode with the lowest ADC precision if the STF detection fails. Second, after the successful reception of the STF field, the receiver operations as discussed here with respect to the recovery of the channel estimation, data header and data fields of the packet are implemented.

Some of the embodiments disclosed herein describe the AGC loop operation with respect to the highest precision ADC (among multiple ADCs) or the highest precision of a single ADC, where the gains (and possibly phases) to be applied with respect to the received signal for high-reliability post-ADC reception are determined. The embodiments disclosed herein also describe variants of a procedure that involves switching to either a lower-precision ADC (among multiple ADCs) or a lower precision of a single ADC when handling the data portion on the packet.

Since the gains (and possibly phases) to be applied with respect to the received signal are dependent on the ADC that will perform the subsequent analog-to-digital conversion operation, the following steps can be performed. First, given the gain (and possibly phase) settings for the various amplifiers with respect to a particular ADC precision, it is possible to determine the corresponding gains (and possibly phases) with respect to a lower-precision ADC. Such a calculation can be performed offline. For example, if the gain to be applied to a particular amplifier with respect to an N1 bit ADC as illustrated in FIG. 6 is denoted by gN1, the gain gN2 to be applied to the same amplifier with respect to an N2 bit ADC, where N2<N1, can be calculated offline and stored. When the switch from the higher precision ADC to the lower precision ADC occurs, the amplifier gains (and possibly phases) are updated as well. Second, the ADC threshold setting operation described herein with respect to an N-bit ADC can involve determining and dividing the input analog signal range into sub-ranges so that all input signals within a certain sub-range are mapped to a pre-determined discrete sample value, represented by a particular value of the N bits output from the ADC. This threshold generating operation, which depends on the ADC precision, is repeated when the ADC precision changes, leading to a new set of thresholds, such as a new set of sub-ranges with respect to the input analog signal. The sub-ranges with respect to a lower-precision ADC can be calculated based on channel estimates and the sub-ranges with respect to the higher precision ADC.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
 processing circuitry configured to:
 use a lower-resolution analog-to-digital conversion (ADC) while operating in an idle mode;
 maintain the lower resolution ADC while searching for a short training field (STF);

transition to an active mode using a higher-resolution ADC in response to detecting a presence of the STF based on a detected change in a received energy signal;

establish communication parameters and operational settings of the ADC operation using the STF of a packet, utilize a channel estimation (CE) portion of the packet to perform channel estimation of a channel, utilize the channel estimates to compensate for distortions introduced by the channel with respect to portions of the packet subsequent to the CE portion, obtain a modulation order and coding scheme used for a data portion of the packet, select the ADC to be used for a recovery of the data portion of the packet, wherein an ADC precision is selected based on information of the data portion of the packet including the modulation order, and recover the information in the data portion of the packet using ADC output samples corresponding to the data portion of the packet.

2. The electronic device of claim 1, wherein the ADC comprises a lowest precision ADC of two or more ADCs, wherein the lowest precision is determined by the modulation order of the data portion of the packet.

3. The electronic device of claim 2, wherein the processing circuitry is configured to operate the lowest precision ADC, determined by the modulation order of the data portion of the packet, in the active mode and the remaining ADCs of the two or more ADCs in the idle mode.

4. The electronic device of claim 1, wherein a single ADC is configured to operate between two or more levels of precision.

5. The electronic device of claim 4, wherein the processing circuitry is configured to set the precision level of the ADC to a lowest precision level of the ADC, wherein the lowest precision is determined by the modulation order of the data portion of the packet.

6. The electronic device of claim 1, wherein the operational settings of the ADC operation are derived from the operational settings of the ADC operation determined from the STF.

7. The electronic device of claim 6, wherein the operational settings of the ADC operation include a mapping from an analog input to the ADC and a digital output from the ADC.

8. The electronic device of claim 1, wherein the processing circuitry is configured to determine gains and phases to be applied with respect to the received signal for a highest-reliability reception, and perform the channel estimation, while using a highest level of precision for the ADC operation.

9. A method for use in an electronic device, the method comprising:

using a lower-resolution analog-to-digital conversion (ADC) while operating in an idle mode;

maintaining the lower resolution ADC while searching for a training field (TF);

transitioning to an active mode using a higher-resolution ADC in response to detecting a presence of the TF based on a detected change in a received energy signal;

establishing communication parameters and operational settings of the ADC operation using the TF of a packet;

utilizing a channel estimation (CE) portion of the packet to perform channel estimation of a channel;

utilize the channel estimates to compensate for distortions introduced by the channel with respect to portions of the packet subsequent to the CE portion;

obtaining a modulation order and coding scheme used for a data portion of the packet;

selecting the ADC to be used for a recovery of the data portion of the packet, wherein an ADC precision is selected based on information of the data portion of the packet including the modulation order; and recovering the information in the data portion of the packet using ADC output samples corresponding to the data portion of the packet.

10. The method of claim 9, wherein the ADC comprises a lowest precision ADC of two or more ADCs, wherein the lowest precision is determined by the modulation order of the portion of the data packet.

11. The method of claim 10, further comprising operating the lowest precision ADC, determined by the modulation order of the data portion of the packet, in the active mode and the remaining ADCs of the two or more ADCs in the idle mode.

12. The method of claim 9, wherein a single ADC is configured to operate between two or more levels of precision.

13. The method of claim 12, further comprising setting the precision level of the ADC to a lowest precision level of the ADC, wherein the lowest precision is determined by the modulation order of the data portion of the packet.

14. The method of claim 9, wherein the operational settings of the ADC operation are derived from the operational settings of the ADC operation determined from the TF.

15. The method of claim 14, wherein the operational settings of the ADC operation include a mapping from an analog input to the ADC and a digital output from the ADC.

16. The method of claim 10, further comprising determining gains and phases to be applied with respect to the received signal for a highest-reliability reception, and performing the channel estimation, while using a highest level of precision for the ADC operation.

* * * * *